(12) United States Patent
Ishikawa et al.

(10) Patent No.: US 8,609,055 B2
(45) Date of Patent: Dec. 17, 2013

(54) METHOD OF PRODUCING FLUOROAPATITE, FLUOROAPATITE, AND ADSORPTION APPARATUS

(75) Inventors: Tsuyoshi Ishikawa, Tochigi (JP); Yoshiyuki Ogawara, Tochigi (JP); Tomohiko Yoshitake, Tokyo (JP); Yukiki Murakami, Saitama (JP)

(73) Assignee: Hoya Corporation, Tokyo (JP)

( * ) Notice: Subject to any disclaimer, the term of this patent is extended or adjusted under 35 U.S.C. 154(b) by 393 days.

(21) Appl. No.: 12/199,112

(22) Filed: Aug. 27, 2008

(65) Prior Publication Data

US 2009/0060814 A1 Mar. 5, 2009

(30) Foreign Application Priority Data

Aug. 30, 2007 (JP) ................. 2007-224009

(51) Int. Cl.
*C01B 25/00* (2006.01)
*C01F 1/00* (2006.01)

(52) U.S. Cl.
USPC ........................................ 423/301; 423/155

(58) Field of Classification Search
USPC ................................ 423/301, 155
See application file for complete search history.

(56) References Cited

U.S. PATENT DOCUMENTS

| | | | |
|---|---|---|---|
| 4,048,300 A | 9/1977 | Tomlinson et al. | |
| 4,971,739 A * | 11/1990 | Ichinose et al. | 264/616 |
| 5,651,882 A | 7/1997 | Ichitsuka et al. | |
| 5,651,884 A | 7/1997 | Ichitsuka et al. | |

| | | |
|---|---|---|
| 2006/0207940 A1 | 9/2006 | Kobayashi et al. |
| 2007/0107600 A1 | 5/2007 | Yoshitake et al. |
| 2009/0148376 A1 | 6/2009 | Ishikawa et al. |

FOREIGN PATENT DOCUMENTS

| | | | |
|---|---|---|---|
| GB | 2452134 | | 2/2009 |
| JP | 58-110465 | | 7/1983 |
| JP | 1264915 | * | 10/1989 |
| JP | 2-180706 | | 7/1990 |
| JP | 2004-330113 | | 11/2004 |
| WO | WO 2006130167 A1 | * | 12/2006 |

OTHER PUBLICATIONS

English translation of JP01264915A.*
English language Abstract of JP 2004-330113.
U.S. Appl. No. 12/184,459, filed Aug. 1, 2008, and entitled "Method of Producing Fluoroapatite, Fluoroapatite, and Adsortion Apparatus."
U.S. Appl. No. 11/559,422, filed Nov. 14, 2006, and entitled "Method for Producing Adsorbent, Adsorbent, and Adsorption Apparatus."
U.S. Appl. No. 12/240,152, filed Sep. 29, 2008, and entitled "Fluoraopatite Dried Particles and Adsorption Appartus."
United Kingdom Further Search Report, dated Nov. 23, 2009, issued with respect to patent family member United Kingdom Patent Application No. GB 0815850.3.

* cited by examiner

*Primary Examiner* — Rebecca Lee
(74) *Attorney, Agent, or Firm* — Greenblum & Bernstein, P.L.C.

(57) ABSTRACT

A method of producing fluoroapatite by using a calcium-based compound containing calcium, hydrogen fluoride and phosphoric acid is provided. The method can be produced fluoroapatite having improved acid resistance by reducing an amount of an impurity derived from a raw material to a low or very low level, and ability capable of separating a large amount of a protein due to a large specific surface area thereof. Further, fluoroapatite having high acid resistance and a large specific surface area is also provided. Furthermore, an adsorption apparatus using such fluoroapatite is also provided.

11 Claims, No Drawings

METHOD OF PRODUCING FLUOROAPATITE, FLUOROAPATITE, AND ADSORPTION APPARATUS

FIELD OF THE INVENTION

The present invention relates to a method of producing fluoroapatite, fluoroapatite, and an adsorption apparatus, and in particular relates to a method of producing fluoroapatite, fluoroapatite that can be produced by the method, and an adsorption apparatus that uses the fluoroapatite.

BACKGROUND ART

Fluoroapatite has almost the same crystalline structure as hydroxyapatite, and therefore shows almost the same adsorption characteristics (adsorption ability) to proteins as hydroxyapatite.

Further, fluoroapatite is a substance that is stabler than hydroxyapatite due to fluorine atom thereof, and therefore has high acid resistance. For these reasons, fluoroapatite has advantages in that it has high resistance to acid solutions, and therefore is capable of separating a protein in an acid solution.

Such fluoroapatite is generally synthesized by adding (mixing) ammonium fluoride as a fluorine source into (with) a slurry containing hydroxyapatite (JP A-2004-330113 is an example of related art.).

However, in the fluoroapatite synthesized by such a method, ammonia which is derived from the ammonium fluoride is adsorbed thereto as an impurity during the synthesizing process. Apatites such as fluoroapatite have a high ability to adsorb ammonia, and therefore in a case where a slurry containing synthesized fluoroapatite is spray-dried (granulated) to obtain particles, ammonia remains in the particles (fluoroapatite particles). That is, it is very difficult to remove ammonia from the fluoroapatite particles.

Therefore, an amount of ammonia remaining in the thus synthesized fluoroapatite particles is different from lot to lot, which makes it difficult to obtain fluoroapatite particles having uniform characteristics.

Further, ammonia adsorbed to hydroxyapatite particles inhibits substitution of hydroxyl groups of hydroxyapatite by fluorine atoms of ammonium fluoride molecules, and therefore there are also problems in that a ratio of substitution of hydroxyl groups of hydroxyapatite by fluorine atoms can be increased only to a certain extent, and therefore it cannot be expected that acid resistance of the synthesized fluoroapatite is further improved.

Furthermore, since fluoroapatite is often used for separating a protein in an acid solution, it is preferred that an amount of the protein to be adsorbed to fluoroapatite is large so that a large amount of the protein can be separated from a sample (that is, the acid solution containing the protein). From this viewpoint, fluoroapatite having a large specific surface area is preferably used.

For these reasons, fluoroapatite which contains an impurity such as ammonia at a low level and has superior acid resistance and a large specific surface area can be preferably used for separating a protein (particularly, contained in an acid solution). However, a method of producing such fluoroapatite has not yet been developed.

SUMMARY OF THE INVENTION

It is one object of the present invention to provide a method of producing fluoroapatite having improved acid resistance by reducing an impurity, such as ammonia, derived from a raw material to a low or very low level, and ability capable of separating a large amount of a protein due to a large specific surface area thereof. Further, it is another object of the present invention to provide fluoroapatite having high acid resistance and a large specific surface area, and an adsorption apparatus using such fluoroapatite as an adsorbent.

These objects are achieved by the present inventions (1) to (14) described below.

(1) A method of producing fluoroapatite by using a calcium-based compound containing calcium, hydrogen fluoride and phosphoric acid, the method comprising: preparing a first liquid containing the calcium-based compound, a second liquid containing the hydrogen fluoride and a third liquid containing the phosphoric acid, respectively; obtaining a first mixture by mixing the first liquid, the second liquid and the third liquid; and reacting the calcium-based compound, the hydrogen fluoride and the phosphoric acid in the first mixture to thereby obtain the fluoroapatite.

According to the method described above, since hydrogen fluoride is used as a fluorine source instead of ammonium fluoride, it is possible to obtain fluoroapatite in which no impurity is contained or an impurity is contained at a very low level. Therefore, it is possible to obtain fluoroapatite having high crystallinity and therefore superior acid resistance due to the high crystallinity. Further, the thus obtained fluoroapatite can separate a large amount of a protein from a sample (acid solution containing the protein) due to a large specific surface area thereof.

(2) In the method described in the above-mentioned item (1), the calcium-based compound is calcium hydroxide.

This makes it possible to reliably prevent incorporation of an impurity derived from the calcium-based compound as a calcium source into the produced fluoroapatite in the reacting step.

(3) In the method described in the above-mentioned item (1), the mixing the first liquid, the second liquid and the third liquid is carried out by mixing the second liquid with the third liquid to obtain a second mixture, and thereafter mixing the first liquid with the second mixture.

This makes it possible to uniformly mix the second liquid and the third liquid with the first liquid to thereby produce the fluoroapatite. Further, the hydroxyl groups of hydroxyapatite can be uniformly substituted by the fluorine atoms of the hydrogen fluoride molecules. Furthermore, it is also possible to reliably prevent or suppress a by-product such as calcium fluoride from being produced in the first mixture.

(4) In the method described in the above-mentioned item (3), the mixing the first liquid with the second mixture is carried out by adding the second mixture into the first liquid drop by drop.

This makes it possible to react the calcium-based compound as a calcium source, the hydrogen fluoride and the phosphoric acid relatively easily. Further, it is also possible to adjust a pH of the first mixture within an appropriate range easily and reliably. For these reasons, decomposition or dissolution of the produced fluoroapatite can be prevented. As a result, it is possible to obtain fluoroapatite (fluoroapatite primary particles) having high purity and a large specific surface area in a high yield.

(5) In the method described in the above-mentioned item (4), a rate of dropping the second mixture into the first liquid is in the range of 1 to 100 L/hour.

This makes it possible to react the calcium-based compound as a calcium source, the hydrogen fluoride and the phosphoric acid under mild conditions.

(6) In the method described in the above-mentioned item (3), an amount of the hydrogen fluoride contained in the second mixture is in the range of 0.5 to 60 wt %.

If the amount of the hydrogen fluoride contained in the second mixture falls within the above noted range, it is possible to produce fluoroapatite having an improved ratio of substituting hydroxyl groups of hydroxyapatite by fluorine atoms in the reacting step. Further, a pH of the first mixture in the production of the fluoroapatite can also be set in an appropriate range due to such an amount of the hydrogen fluoride. Furthermore, hydrogen fluoride has strong acidity. However, according to the method of present invention, since a pH of the second mixture does not become extremely low due to such an amount of the hydrogen fluoride, the second mixture can be handled (treated) safely.

(7) In the method described in the above-mentioned item (3), an amount of the phosphoric acid contained in the second mixture is in the range of 1 to 90 wt %.

If the amount of the phosphoric acid contained in the second mixture falls within the above noted range, the fluoroapatite can be produced in the reacting step efficiently. Furthermore, since a pH of the second mixture does not become extremely low, the second mixture can be handled (treated) safely.

(8) In the method described in the above-mentioned item (3), an amount of the phosphoric acid contained in the second mixture is in the range of 2.0 to 4.5 times in a mol amount with respect to an amount of the hydrogen fluoride contained in the second mixture.

This makes it possible to efficiently produce fluoroapatite having a high ratio of substituting hydroxyl groups of hydroxyapatite by fluorine atoms.

(9) In the method described in the above-mentioned item (1), an amount of the calcium-based compound contained in the first mixture is in the range of 1 to 20 wt %.

This makes it possible to produce fluoroapatite in the reacting step more efficiently. Further, in the case where the fluoroapatite is produced by stirring the first mixture in the reacting step, the first mixture can be reliably stirred at relative low energy due to such an amount of the calcium-based compound. Furthermore, since the first mixture can be stirred sufficiently, hydroxyl groups of hydroxyapatite can be uniformly substituted by fluorine atoms of the hydrogen fluoride molecules.

(10) In the method described in the above-mentioned item (1), in the reacting step the calcium-based compound, the hydrogen fluoride and the phosphoric acid in the first mixture are reacted at a temperature in the range of 5 to 50° C.

According to this method, even if a pH of the first mixture is adjusted to a relative low value, decomposition or dissolution of the produced fluoroapatite can be prevented. Further, it is also possible to improve a reaction ratio among the calcium-based compound as a calcium source, the phosphoric acid and the hydrogen fluoride due to heat.

(11) Fluoroapatite produced by using the method described in the above-mentioned item (1).

According to the fluoroapatite described above, it is possible to improve acid resistance and obtain a large specific surface area.

(12) Fluoroapatite which is obtained from hydroxyapatite having hydroxyl groups and hydrogen fluoride molecules each having a fluorine atom, at least a part of the hydroxyl groups being substituted by the fluorine atoms, wherein when the fluoroapatite is granulated to obtain dried particles and then the dried particles are sintered to obtain sintered particles, a specific surface area of the dried particles or a specific surface area of the sintered particles is 30 $m^2$/g or larger.

The dried particles or sintered particles having such a specific surface area can separate a large amount of a protein from a sample.

(13) In the fluoroapatite described in the above-mentioned item (12), when the dried particles of which average particle size is 40 µm±5 µm are classified, the classified dried particles are sintered at a temperature of 400° C. or lower to obtain sintered particles, a column having a filling space of which inner diameter is 4 mm and length is 100 mm is prepared, the classified dried particles or the sintered particles are filled into the filling space of the column, a 10 mM sodium phosphate buffer having a pH of 5 at room temperature is prepared and 20 mL of the 10 mM sodium phosphate buffer is made to flow in the filling space at a flow rate of 1.0 mL/min to thereby equilibrate the classified dried particles or the sintered particles filled into the filling space, and then 10 mL of the 10 mM sodium phosphate buffer is made to flow in the filling space again to obtain 10 mL of an eluate, a concentration of Ca contained in the thus obtained eluate is 8 ppm or less per 1 g of the classified dried particles or the sintered particles.

Such fluoroapatite has superior acid resistance.

(14) An adsorption apparatus provided with an adsorbent, wherein the adsorbent is comprised of dried particles obtained by granulating the fluoroapatite described in the above-mentioned item (12) or sintered particles obtained by sintering the dried particles.

This makes it possible to provide an adsorption apparatus provided with an adsorbent having high acid resistance and a large specific surface area.

According to the present invention, since hydrogen fluoride is used as a fluorine source, it is possible to obtain fluoroapatite in which no impurity is contained or an impurity is contained at a very low level. Therefore, it is possible to obtain fluoroapatite having high crystallinity. As a result, the thus obtained fluoroapatite has high acid resistance.

Further, according to the present invention, since fluoroapatite having a large specific surface area can be obtained by reacting a calcium-based compound, hydrogen fluoride and phosphoric acid, such fluoroapatite can separate a large amount of a protein from a sample.

BEST MODE FOR CARRYING OUT THE INVENTION

Generally, hydrogen fluoride has strong acidity. Therefore, heretofore, ammonium fluoride has been used for producing of fluoroapatite.

However, the present inventors devoted themselves to study the above problems. As a result, the present inventors have conceived that fluoroapatite in which no impurity is contained or an impurity is contained at a very low level can be produced or obtained by using hydrogen fluoride as a fluorine source.

The present inventors devoted themselves to study this conception further. As a result, the present inventors have found that fluoroapatite having a large specific surface area can be produced by mixing a first liquid containing a calcium-based compound, a second liquid containing hydrogen fluoride and a third liquid containing phosphoric acid to obtain a first mixture, and then reacting the calcium-based compound, the hydrogen fluoride and the phosphoric acid in the first mixture. The present inventors have accomplished the present invention as described above.

Hereinbelow, a method of producing fluoroapatite, fluoroapatite, and an adsorption apparatus according to the present invention will be described in detail with reference to their preferred embodiments.

First, the method of producing fluoroapatite according to the present invention will be described.

The method of producing fluoroapatite according to the present invention includes a liquid preparation step (S1) for preparing each liquid used in the present invention, and a fluoroapatite production step (S2) for producing the fluoroapatite by mixing the prepared liquids to each other. Hereinbelow, these steps will be described in this order.

<S1> Liquid Preparation Step (First Step)

<S1-1> First Liquid (Solution Containing Calcium-Based Compound as Calcium Source) Preparation Step First, a first liquid containing a calcium-based compound containing calcium as a calcium source is prepared.

Examples of the calcium-based compound (calcium source) to be contained in the first liquid include, but not limited thereto, calcium hydroxide, calcium oxide, calcium nitrate and the like. These compounds may be used singly or in combination of two or more of them. Among them, calcium hydroxide is particularly preferred as the calcium source. This makes it possible to reliably obtain fluoroapatite in which an impurity is contained at a low level in the fluoroapatite production step (S2) which will be described later in detail.

A solution or suspension containing the calcium-based compound as the calcium source can be used as the first liquid. In the case where the calcium-based compound is calcium hydroxide, a calcium hydroxide suspension in which the calcium hydroxide is suspended in water is used preferably. If fluoroapatite is produced by using such a calcium hydroxide suspension in the fluoroapatite production step (S2), it is possible to obtain fine fluoroapatite primary particles. Further, even if aggregates (secondary particles) in which the fine fluoroapatite primary particles are agglutinated is obtained, the aggregates are uniformly dispersed in such a calcium hydroxide suspension.

An amount of the calcium-based compound as the calcium source contained in the first liquid is preferably in the range of about 1 to 20 wt %, and more preferably in the range of about 5 to 12 wt %. This makes it possible to more efficiently produce the fluoroapatite in the step S2. Further, it is also possible to sufficiently stir the first liquid (solution or suspension) at relatively low energy in the step S2. Furthermore, since the first mixture can be stirred sufficiently, hydroxyl groups of hydroxyapatite can be uniformly substituted by fluorine atoms of the hydrogen fluoride molecules.

<S1-2> Second Liquid (Hydrogen Fluoride-Containing Solution) Preparation Step

Next, a second liquid containing hydrogen fluoride (hydrogen fluoride-containing solution) is prepared.

A solvent for dissolving the hydrogen fluoride is not particularly limited, and any solvent can be used as long as it does not inhibit a reaction to be carried out in the step S2.

Examples of such a solvent include water, an alcohol such as methanol and ethanol, and the like. These solvents may be used in combination of two or more of them. However, among them, water is particularly preferred. By using water as a solvent, it is possible to more reliably prevent the inhibition of the reaction to be carried out in the step S2.

<S1-3> Third Liquid (Phosphoric Acid-Containing Solution) Preparation Step

Next, a third liquid containing phosphoric acid (phosphoric acid-containing solution) is prepared.

A solvent for dissolving phosphoric acid is not particularly limited, and any solvent can be used as long as it does not inhibit a reaction to be carried out in the step S2. The same solvent can be used as the solvent for dissolving the hydrogen fluoride in the step S1-2 described above.

It is to be noted that both the solvent for dissolving the hydrogen fluoride and the solvent for dissolving the phosphoric acid are preferably the same kind of solvent or the same solvent. This makes it possible to uniformly mix the second liquid and the third liquid to the first liquid in the first mixture obtained in the step S2 which will be described later. As a result, it is possible to produce fluoroapatite having a uniform ratio of substituting the hydroxyl groups of hydroxyapatite by the fluorine atoms of the hydrogen fluoride molecules.

A first mixture is obtained by mixing the first, second and third liquids prepared as described above, but the mixing order thereof is not limited as long as the calcium-based compound, hydrogen fluoride and phosphoric acid can be simultaneously existed in a first mixture in which the first, second and third liquids are mixed in the step S2. However, it is preferred that after the second liquid is mixed with the third liquid to obtain a second mixture, and then the second mixture is added to the first liquid to obtain the first mixture. By mixing the first, second and third liquids in this order, the second liquid and the third liquid can be uniformly mixed with the first liquid. Further, the hydroxyl groups of hydroxyapatite can be uniformly substituted by the fluorine atoms of the hydrogen fluoride molecules. Furthermore, it is possible to reliably prevent or suppress a by-product such as calcium fluoride from being produced.

In this regard, it is to be noted that examples of a method of obtaining the first mixture other than the method described above include: a method of substantially simultaneously adding the second liquid and the third liquid to the first liquid; a method of substantially simultaneously adding the first liquid and the third liquid to the second liquid; and a method of substantially simultaneously adding the first liquid and the second liquid to the third liquid.

Hereinafter, description will be made, as a representative, with respect to the case where after the second mixture is prepared, the second mixture is mixed with the first liquid to obtain the first mixture, thereby producing fluoroapatite.

<S1-4> Second Mixture Preparation Step

Next, the second liquid and the third liquid, which are prepared in the steps S1-2 and S1-3, respectively, are mixed to each other to obtain the second mixture.

An amount of hydrogen fluoride contained in the second mixture is preferably in the range of about 0.5 to 60 wt %, and more preferably in the range of about 1.0 to 10 wt %. By setting the amount of the hydrogen fluoride contained in the second mixture to a value within the above range, it is possible to improve a ratio of substituting the hydroxyl groups of hydroxyapatite by the fluorine atoms of the hydrogen fluoride molecules in the production of the fluoroapatite in the step S2. Further, a pH of the first mixture in the production of the fluoroapatite can also be set in an appropriate range due to such an amount of the hydrogen fluoride. Furthermore, hydrogen fluoride has strong acidity. However, since a pH of the second mixture does not become extremely low due to such an amount of the hydrogen fluoride, the second mixture can be handled (treated) safely.

An amount of phosphoric acid contained in the second mixture is preferably in the range of about 1.0 to 90 wt %, and more preferably in the range of about 5.0 to 20 wt %. By setting the amount of the phosphoric acid contained in the second mixture to a value within the above range, the fluoroapatite can be produced in the step S2 efficiently. Furthermore, since a pH of the second mixture does not become extremely low due to such an amount of the phosphoric acid, the second mixture can be handled (treated) safely.

The amount of the phosphoric acid contained in the second mixture is preferably in the range of about 2.0 to 4.5 times in a mol amount, and more preferably in the range of about 2.8 to 4.0 with respect to the hydrogen fluoride contained in the second mixture at a mol amount. This makes it possible to efficiently produce fluoroapatite having a high ratio of substituting the hydroxyl groups of hydroxyapatite by the fluorine atoms of the hydrogen fluoride molecules.

<S2> Fluoroapatite Production Step

Next, the first liquid (solution containing calcium-based compound) prepared in the step S1-1 described above is mixed with the second mixture obtained in the step S1-4 described above to obtain the first mixture. Then, the calcium-based compound as a calcium source is reacted with hydrogen fluoride and phosphoric acid in the first mixture to thereby obtain fluoroapatite primary particles.

More specifically, in the case where calcium hydroxide is used as the calcium source, by bringing the calcium hydroxide into contact with hydrogen fluoride and phosphoric acid, it is possible to obtain the fluoroapatite primary particles as shown in the following formula (I).

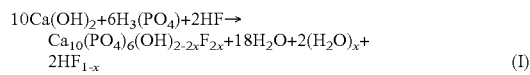

$$10Ca(OH)_2 + 6H_3(PO_4) + 2HF \rightarrow Ca_{10}(PO_4)_6(OH)_{2-2x}F_{2x} + 18H_2O + 2(H_2O)_x + 2HF_{1-x} \quad (I)$$

(wherein $0 < x \leq 1$)

As described above, the fluoroapatite primary particles can be reliably produced by bringing hydrogen fluoride and phosphoric acid into contact with the calcium-based compound (calcium hydroxide) as the calcium source, and then reacting the hydrogen fluoride, the phosphoric acid and the calcium-based compound with simple handling that the first liquid is mixed with the second mixture.

The fluoroapatite produced by the reaction as shown in the above formula (I) has a large specific surface area.

The fluoroapatite primary particles obtained by using such a method are granulated to obtain dried particles. The dried particles are sintered to obtain sintered particles. A specific surface area of each of the dried particles and the sintered particles is preferably 30.0 m²/g or larger, more preferably 43.0 m²/g or larger, and even more preferably 45.0 m²/g or larger. The dried particles and the sintered particles each having such a specific surface area can separate a large amount of a protein due to a large specific surface area thereof.

The specific surface area of the sintered particles usually tends to become small by setting a high sintering temperature and a long sintering time in obtaining the sintered particles. However, since the specific surface area of the dried particles or the sintered particles is large as described above, the present invention has an advantage in that sintered particles having a predetermined specific surface area can be obtained by setting sintering conditions such as a sintering temperature and a sintering time in obtaining the sintered particles from the dried particles, or subjecting to a treatment such as further sintering the sintered particles.

As shown in the above formula (I), it is supposed that the fluoroapatite is produced by substituting the hydroxyl groups of hydroxyapatite by the fluorine atoms of the hydrogen fluoride molecules simultaneously with producing hydroxyapatite primary particles. Therefore, it is possible to obtain a high ratio of substituting the hydroxyl groups of hydroxyapatite by the fluorine atoms of the hydrogen fluoride molecules.

Further, since hydrogen fluoride (HF) is used as a fluorine source in the present invention, no by-product is formed or an amount of a by-product is extremely small as compared to a case where ammonium fluoride ($NH_4F$), lithium fluoride (LiF), sodium fluoride (NaF), potassium fluoride (KF), magnesium fluoride ($MgF_2$), calcium fluoride ($CaF_2$), or the like is used as the fluorine source. Therefore, the amount of the by-product (impurity) contained in fluoroapatite primary particles can be made small so that acid resistance of the fluoroapatite primary particles is improved. It is to be noted that the term "impurity" used herein means ammonia, lithium, calcium fluoride or the like which is derived from a raw material of fluoroapatite.

More specifically, the impurity content of the fluoroapatite is preferably as small as possible. For example, it is preferably 300 ppm or less, and more preferably 100 ppm or less. This makes it possible to further improve acid resistance of the fluoroapatite primary particles due to their low impurity content.

According to the present invention, by adjusting the conditions (e.g., pH, temperature, time) of the reaction among the calcium-based compound (calcium source), hydrogen fluoride and phosphoric acid, it is possible to allow the impurity content contained in the fluoroapatite primary particles to fall within the above range.

The first liquid and the second mixture may be mixed together at one time to obtain the first mixture, but they are preferably mixed by adding (dropping) the second mixture into the first liquid drop by drop. By dropping the second mixture into the first liquid, it is possible to relatively easily react the calcium-based compound, hydrogen fluoride and phosphoric acid and to more easily and reliably adjust a pH of the first mixture to a value within an appropriate range. For these reasons, decomposition or dissolution of the produced fluoroapatite can be prevented. As a result, it is possible to obtain fluoroapatite (fluoroapatite primary particles) having high purity and a large specific surface area in a high yield.

A rate of dropping the second mixture into the first liquid is preferably in the range of about 1 to 100 L/hr, and more preferably in the range of about 10 to 100 L/hr. By mixing (adding) the second mixture with (to) the first liquid at such a dropping rate, it is possible to react the calcium-based compound, hydrogen fluoride and phosphoric acid under milder conditions.

Further, the reaction among the calcium-based compound, hydrogen fluoride and phosphoric acid is preferably carried out while the first mixture is stirred. By stirring the first mixture, it is possible to bring the calcium-based compound into uniformly contact with hydrogen fluoride and phosphoric acid and thereby to allow the reaction among the calcium-based compound, the hydrogen fluoride and the phosphoric acid to efficiently proceed. In addition, the hydroxyl groups of the hydroxyapatite are uniformly substituted by the fluorine atoms of the hydrogen fluoride molecules. By using such fluoroapatite primary particles, it is possible to produce, for example, an adsorbent (dried particles or sintered particles) having less characteristic variations and high reliability.

In this case, power for stirring the first mixture (slurry) is preferably in the range of about 0.5 to 3 W, and more preferably in the range of about 0.9 to 1.8 W per 1 liter of the slurry. By setting the stirring power to a value within the above range, it is possible to further improve the efficiency of the reaction among the calcium-based compound as a calcium source, hydrogen fluoride and phosphoric acid.

A temperature of the reaction among the calcium-based compound as the calcium source, hydrogen fluoride and phosphoric acid is not particularly limited, but is preferably in the range of about 5 to 50° C., and more preferably in the range of about 20 to 40° C. By setting the temperature to a value within the above range, it is possible to prevent decomposition or dissolution of the produced fluoroapatite even if a pH of the first mixture is adjusted to a low value. Further, it is also possible to improve a reaction ratio among the calcium-based compound as the calcium source, the phosphoric acid and the hydrogen fluoride.

In such a manner as described above, the calcium-based compound as the calcium source, hydrogen fluoride and phosphoric acid are reacted so that the fluoroapatite is obtained.

The fluoroapatite is not limited to pure fluoroapatite as shown by the formula (I) described above wherein degree of halogenation represented as x is 1 (i.e., fluoroapatite obtained by substituting all the hydroxyl groups of the hydroxyapatite by the fluorine atoms). The fluoroapatite also includes one obtained by substituting only part of the hydroxyl groups of the hydroxyapatite by the fluorine atoms of the hydrogen fluoride molecules.

Further, according to the present invention, it is possible to produce the fluoroapatite which is obtained by that the hydroxyl groups of the hydroxyapatite primary particles present not only in the surface but also in the inside portion of hydroxyapatite primary particles are substituted by the fluorine atoms of the hydrogen fluoride molecules. More specifically, it is possible to substitute 75% or more of the hydroxyl groups of the hydroxyapatite by the fluorine atoms of the hydrogen fluoride molecules. Further, by appropriately adjusting reaction conditions (e.g., pH, temperature, time, each amount of hydrogen fluoride and phosphoric acid to be mixed) of the reaction among the calcium-based compound as the calcium source, hydrogen fluoride and phosphoric acid, it is also possible to substitute about 100% of the hydroxyl groups of hydroxyapatite by the fluorine atoms of the hydrogen fluoride molecules. It is to be noted that the fluoroapatite obtained by substituting 50% or more of the hydroxyl groups of hydroxyapatite by the fluorine atoms of the hydrogen fluoride molecules is preferred because it has particularly excellent acid resistance due to the fluorine atoms.

Further, such fluoroapatite primary particles contain a very little amount of an impurity, and are therefore stable and excellent in acid resistance.

The level of the acid resistance of the fluoroapatite primary particles can be determined by, for example, the following method.

More specifically, the level of the acid resistance of the fluoroapatite primary particles can be determined by bringing the fluoroapatite primary particles or sintered particles, which are obtained by sintering dried particles obtained by granulating the fluoroapatite primary particles, into contact with an acid solution and then measuring an amount of Ca eluted from the fluoroapatite primary particles or the sintered particles.

For example, dried particles having an average particle size of 40 μm±5 μm in the dried particles granulated by using the fluoroapatite are classified, and then the classified dried particles or sintered particles, which are obtained by sintering the classified dried particles at a temperature of 400° C. or lower, are filled into a filling space of a column. Then, 20 mL of a 10 mM phosphate buffer solution having a pH of 5 (at room temperature) is allowed to pass through the filling space of the column (4 mm×100 mm) at a flow rate of 1.0 mL/min to thereby equilibrate the classified dried particles or the sintered particles filled into the filling space. Thereafter, 10 mL of the 10 mM phosphate buffer solution is allowed to pass through the filling space of the column again to obtain 10 mL of an eluate containing Ca. Then, a concentration of Ca contained in the thus obtained eluate is measured. Next, the concentration of Ca is converted in an elution concentration per 1 g of an adsorbent (classified dried particles or sintered particles) to thereby determine the level of acid resistance of the dried particles or sintered particles.

The Ca concentration converted in the elution concentration per 1 g of the adsorbent under the conditions described above is preferably as low as possible, i.e., as close to "0 ppm" as possible. More specifically, the Ca concentration is preferably 8 ppm or less, and more preferably 5 ppm or less. When the concentration of Ca eluted from the sintered particles (fluoroapatite particles) is low, it can be judged that the fluoroapatite particles have extremely high acid resistance.

Examples of a buffer solution other than the sodium phosphate buffer solution to be used for determining the level of acid resistance include phosphate, acetate, citrate, carbonate, succinate, and glycine buffers.

Further, a salt concentration of the buffer solution is 10 mM as described above, but preferably in the range of about 1 to 500 mM, and more preferably in the range of about 5 to 500 mM.

The dried particles of the fluoroapatite can be obtained by drying or granulating the first mixture (slurry) containing the fluoroapatite primary particles produced as described above, and the dried particles can be further sintered to obtain sintered particles.

The dried particles and the sintered particles can be used as an adsorbent. In this case, sintered particles are preferred from the viewpoint of mechanical strength. However, in a case where a load to be applied to the adsorbent is relatively light, the dried particles may also be used as the adsorbent. By using such an adsorbent as a stationary phase of an adsorption apparatus used in chromatography, it is possible to expand the range of choices of conditions for separation or adsorption of an object to be tested (e.g., protein) and thereby to apply such an adsorption apparatus used in chromatography to a wider range of areas (fields).

It is to be noted that a method of drying or granulating the slurry containing the fluoroapatite primary particles is not particularly limited, and an example of such a method includes spray drying using a spray drier and the like.

A sintering temperature of the dried particles is preferably in the range of about 200 to 800° C., and more preferably in the range of about 400 to 700° C. By setting the sintering temperature to a value within the above range, it is possible to obtain an adsorbent having excellent mechanical strength while gaps (pores) are allowed to remain in the fluoroapatite primary particles or between the fluoroapatite primary particles adjacent to each other (i.e., in aggregates).

Further, when the dried particles are sintered, a specific surface area of the sintered particles usually tends to become small due to the sintering conditions. However, by appropriately setting the sintering temperature so as to fall within the above noted range, it is possible to obtain sintered particles having a predetermined specific surface area.

The application of the fluoroapatite is not limited to such an adsorbent. For example, the dried particles of fluoroapatite may be molded and then sintered to obtain a sintered body. The thus obtained sintered body can be used as artificial bone or dental root.

Although the method of producing the fluoroapatite, the fluoroapatite, and the adsorption apparatus according to the present invention have been described above with reference to their preferred embodiments, the present invention is not limited to these embodiments.

For example, the method of producing the fluoroapatite according to the present invention may further include one, two or more steps for any purpose.

EXAMPLES

Hereinbelow, the present invention will be described with reference to actual examples.

1. Production of Fluoroapatite

Example 1

First, 3.5 kg of calcium hydroxide was prepared as a calcium source. Then, the calcium hydroxide was suspended in 30 L of pure water to thereby prepare a first liquid.

Next, 4.5 kg of an aqueous hydrogen fluoride solution having a concentration of 4.2 wt % (second liquid) and 3.27 kg of an aqueous phosphoric acid solution having a concentration of 85 wt % (third liquid) were prepared, respectively. Then, the aqueous hydrogen fluoride solution and the aqueous phosphoric acid solution were mixed with 10 L of pure water to thereby prepare a second mixture.

Next, the second mixture was dropped into the first liquid at a rate of 5 L/hr in a state that the first liquid was stirred at a stirring power of 1 W to obtain a slurry.

It is to be noted that a pH of the slurry at the time of completion of the dropping of the second mixture was 3.4.

Further, the slurry was stirred at a stirring power of 1 W at 30° C. for 24 hours to react the calcium hydroxide, hydrogen fluoride and phosphoric acid in the slurry. As a result, a slurry containing fluoroapatite primary particles was obtained.

It is to be noted that a reaction product contained in the slurry was found to be fluoroapatite by powder X-ray diffractometry. Further, as a result of powder X-ray diffracting the fluoroapatite primary particles, a ratio of substitution of the hydroxyl groups of hydroxyapatite by the fluorine atoms of hydrogen fluoride molecules was about 100%.

Further, as a result of powder x-ray diffraction of fluoroapatite dried particles described later, any products other than the fluoroapatite were not detected.

Then, the slurry containing the fluoroapatite primary particles was spray-dried at 150° C. using a spray drier (manufactured by OHKAWARA KAKOHKI Co., Ltd. under the trade name of "OC-20") to produce particulate dried particles (hereinafter, referred to as "fluoroapatite dried particles".).

Then, a part of the fluoroapatite dried particles were classified to obtain the fluoroapatite dried particles having a median particle size of about 40 μm, and then the fluoroapatite dried particles were sintered in an electric furnace at each condition of 200° C. for 4 hours, 300° C. for 4 hours, 400° C. for 4 hours, 500° C. for 4 hours, 600° C. for 4 hours, 700° C. for 4 hours, and 800° C. for 4 hours to obtain sintered particles (hereinafter, referred to as "fluoroapatite sintered particles".) 1 to 7, respectively.

It is to be noted that each of the seven kinds of fluoroapatite sintered particles 1 to 7 (adsorbents) had an average particle size of about 40 μm.

Comparative Example

First, calcium hydroxide was suspended in pure water to obtain a calcium hydroxide suspension, and then an aqueous phosphoric acid solution was dropped into the calcium hydroxide suspension while the calcium hydroxide suspension was sufficiently stirred. As a result, 500 L of a slurry containing 10 wt % of hydroxyapatite primary particles was obtained.

It is to be noted that the thus obtained reaction product were found to be hydroxyapatite by powder X-ray diffractometry.

On the other hand, hydrogen fluoride was dissolved in pure water so that an amount thereof is 5 wt % to prepare a hydrogen fluoride-containing solution.

Then, 41.84 L of the hydrogen fluoride-containing solution was dropped into the slurry at a rate of 5 L/hr while the slurry was stirred at a stirring power of 1 W.

It is to be noted that the slurry had a pH of 3.00 at the time when the dropping of the hydrogen fluoride-containing solution was completed. An amount of the hydrogen fluoride to be mixed with the slurry was determined so that an amount of fluorine atoms became about 1.05 times with respect to an amount of the hydroxyl groups of hydroxyapatite.

Further, the slurry was stirred at a stirring power of 1 W at 30° C. for 24 hours to react the hydroxyapatite primary particles with hydrogen fluoride. As a result, a slurry containing fluoroapatite primary particles was obtained.

It is to be noted that a reaction product contained in the slurry was found to be fluoroapatite by powder X-ray diffractometry. Further, as a result of powder x-ray diffraction of the fluoroapatite (fluoroapatite primary particles), a ratio of substituting the hydroxyl groups of hydroxyapatite by the fluorine atoms of hydrogen fluoride molecules was found to be about 100%.

Further, as a result of powder X-ray diffraction of fluoroapatite dried particles described later, any products other than fluoroapatite were not detected.

Then, the slurry containing the fluoroapatite primary particles was spray-dried at 150° C. using a spray drier (manufactured by OHKAWARA KAKOHKI Co., Ltd. under the trade name of "OC-20") to produce particulate dried particles (hereinafter, referred to as "fluoroapatite dried particles".).

Then, a part of the fluoroapatite dried particles were classified to obtain the fluoroapatite dried particles having a median particle size of about 40 μm, and then the fluoroapatite dried particles were sintered in an electric furnace at each condition of 200° C. for 4 hours, 300° C. for 4 hours, 400° C. for 4 hours, 500° C. for 4 hours, 600° C. for 4 hours, 700° C. for 4 hours, and 800° C. for 4 hours to obtain sintered particles (hereinafter, referred to as "fluoroapatite sintered particles".) 1 to 7, respectively.

It is to be noted that each of the seven kinds of fluoroapatite sintered particles 1 to 7 (adsorbents) had an average particle size of about 40 μm.

2. Measurement of Specific Surface Area and Ca Elution Amount 2-1. Measurement of Specific Surface Area Each of the fluoroapatite dried particles and the fluoroapatite sintered particles 1 to 7 obtained in the Example and the Comparative Example was subjected to a automatic specific surface area analyzer ("Macdel model-1201" produced by Mountech Co., Ltd) to obtain a specific surface area thereof.

2-2. Measurement of Ca Elution Amount

Each of the fluoroapatite dried particles and the fluoroapatite sintered particles 3 and 6 obtained in the Example and the Comparative Example was filled into a filling space of a column ("LCI-1116WF −4 mm×100 mm PL-PEEK", Sugiyama Shoji Co., Ltd., inner diameter: 4.0 mm, length: 100 mm) so that the filling space of the column was almost fully filled with each of the fluoroapatite dried particles and the fluoroapatite sintered particles 3 and 6. In this way, the columns filled with the fluoroapatite dried particles and the fluoroapatite sintered particles 3 and 6 obtained in the Example and the Comparative Example, respectively, were prepared.

It is to be noted that the capacity of the filling space of each column was 1.256 mL.

Then, 20 mL of a 10 mM sodium phosphate buffer of pH 5 (at 25° C.) was allowed to pass through each of the filling spaces of the columns at a flow rate of 1.0 mL/min to thereby equilibrate the fluoroapatite dried particles and the fluoroapatite sintered particles 3 and 6 obtained in the Example and the Comparative Example. Thereafter, 10 mL of the sodium phosphate buffer was allowed to pass thorough each of the filling spaces of the columns again to obtain 10 mL of an eluate.

Each of Ca concentrations in the eluates discharged from the columns filled with each of the fluoroapatite dried particles and the fluoroapatite sintered particles 3 and 6 obtained in the Example and the Comparative Example respectively was measured by ICP (Inductive Coupled Plasma) equipment (sequential plasma spectrometer) (manufactured by Shimadzu Corporation under the trade name of "ICPS-7500"). Then, the Ca concentrations were converted to elution concentrations per 1 g of the adsorbents (the fluoroapatite dried particles and the fluoroapatite sintered particles 3 and 6 obtained in the Example and the Comparative Example).

3. Evaluation

Each of the specific surface area and the Ca elution amount obtained in the Example and the Comparative Example, which were measured in above items 2-1 and 2-2, are shown in Table 1.

larger about 30 $m^2/g$ than the specific surface area of the fluoroapatite dried particles obtained in the Comparative Example.

In contrast, the specific surface area of the fluoroapatite sintered particles 7 obtained in the Example was the same size as that of the specific surface area of the fluoroapatite sintered particles 7 obtained in the Comparative Example.

As described above, the fluoroapatite dried particles having large specific surface area were obtained in Example. By setting appropriately the sintering conditions of the fluoroapatite dried particles, the fluoroapatite sintered particles having a specific surface area of a predetermined size can be obtained.

It is to be noted that fluoroapatite is produced by a method other than the method in the Example. The method was carried out as follows. First, a first liquid, a second liquid and a third liquid were prepared as described above. Next, the first liquid, the second liquid and the third liquid were mixed virtually simultaneously to obtain a first mixture. Thereafter,

TABLE 1

| | Ratio of substituting hydroxyl groups of hydroxyapatite by fluorine atoms as fluorine source | Kind of particles | Sintering temperature of dried particles | Specific surface area [$m^2/g$] | Ca concentration [ppm] |
|---|---|---|---|---|---|
| Ex. | 100% | Dried particles | No sinter | 59.15 | 7.14 |
| | | Sintered particles 1 | 200° C. | 47.40 | — |
| | | Sintered particles 2 | 300° C. | 46.26 | — |
| | | Sintered particles 3 | 400° C. | 43.72 | 4.10 |
| | | Sintered particles 4 | 500° C. | 44.60 | — |
| | | Sintered particles 5 | 600° C. | 33.78 | — |
| | | Sintered particles 6 | 700° C. | 18.04 | 2.57 |
| | | Sintered particles 7 | 800° C. | 9.17 | — |
| Comp. Ex. | 100% | Dried particles | No sinter | 29.21 | 15.59 |
| | | Sintered particles 1 | 200° C. | 26.24 | — |
| | | Sintered particles 2 | 300° C. | 26.24 | — |
| | | Sintered particles 3 | 400° C. | 25.27 | 9.41 |
| | | Sintered particles 4 | 500° C. | 25.81 | — |
| | | Sintered particles 5 | 600° C. | 22.08 | — |
| | | Sintered particles 6 | 700° C. | 16.19 | 2.16 |
| | | Sintered particles 7 | 800° C. | 10.16 | — |

As can be seen from the Ca concentrations shown in Table 1, the liberation of Ca from the fluoroapatite dried particles and the fluoroapatite sintered particles 3 and 6 obtained in the Example and the Comparative Example into the eluates was properly suppressed. In other words, the liberation of Ca from the fluoroapatite produced by using hydrogen fluoride as the fluorine source into the eluate was properly suppressed.

From the results, it can be supposed that the fluoroapatite dried particles and the fluoroapatite sintered particles 1 to 7 obtained in the Example and the Comparative Example have high acid resistance.

Further, as can be seen from the values of the specific surface area shown in Table 1, the specific surface area of the fluoroapatite dried particles obtained in the Example was a calcium-based compound, hydrogen fluoride and phosphoric acid were reacted in the first mixture to produce fluoroapatite. Then, a specific surface area of the thus produced fluoroapatite was measured as described above. Then, a column by using the produced fluoroapatite was prepared, a sodium phosphate buffer was allowed to pass through a filling space of the column to obtain an eluate, and Ca concentration in the eluate was measured as described above. In this case, the liberation of Ca from the produced fluoroapatite into the eluate was properly suppressed as described above. Additionally, fluoroapatite having a large specific surface area was also obtained as described above.

Further, it is also to be understood that the present disclosure relates to subject matter contained in Japanese Patent Application No. 2007-224009 (filed on Aug. 30, 2007) which is expressly incorporated herein by reference in its entireties.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

What is claimed is:

1. A method of producing fluoroapatite by using a calcium-based compound containing calcium, hydrogen fluoride and phosphoric acid, the method comprising:
    preparing a first liquid containing the calcium-based compound, a second liquid prepared by mixing the hydrogen fluoride as a fluorine source and water and a third liquid containing the phosphoric acid, respectively;
    mixing the first liquid, the second liquid and the third liquid by adding the second and third liquids into the first liquid, drop by drop, to obtain a first mixture;
    stirring the first mixture;
    reacting the calcium-based compound, the hydrogen fluoride and the phosphoric acid in the first mixture at a temperature in the range of 5 to 50° C. to thereby obtain particles of the fluoroapatite;
    drying the particles to obtain dried particles of the fluoroapatite; and
    sintering the dried particles at a temperature in the range of 300 to 800° C. to obtain sintered particles of the fluoroapatite.

2. The method as claimed in claim 1, wherein the calcium-based compound is calcium hydroxide.

3. The method as claimed in claim 1, wherein the mixing the first liquid, the second liquid and the third liquid is carried out by mixing the second liquid with the third liquid to obtain a second mixture, and thereafter adding the second mixture into the first liquid drop by drop.

4. The method as claimed in claim 3, wherein a rate of dropping the second mixture into the first liquid is in the range of 1 to 100 L/hour.

5. The method as claimed in claim 3, wherein an amount of the hydrogen fluoride contained in the second mixture is in the range of 0.5 to 60 wt %.

6. The method as claimed in claim 3, wherein an amount of the phosphoric acid contained in the second mixture is in the range of 1 to 90 wt %.

7. The method as claimed in claim 3, wherein an amount of the phosphoric acid contained in the second mixture is in the range of 2.0 to 4.5 times in a mol amount with respect to an amount of the hydrogen fluoride contained in the second mixture.

8. The method as claimed in claim 1, wherein an amount of the calcium-based compound contained in the first mixture is in the range of 1 to 20 wt %.

9. The method as claimed in claim 1, wherein in the stirring the first mixture, a power of stirring the first mixture is in the range of 0.5 to 3 W per 1 L of the first mixture.

10. The method as claimed in claim 1, wherein pH of the first mixture is 3.4.

11. The method as claimed in claim 1, further comprising classifying the dried parties so as to have an average particle size of 40 μm±5 μm.

* * * * *